Oct. 10, 1933.          J. C. GARAND          1,929,418
                          GUN SIGHT
                     Filed Dec. 10, 1930          2 Sheets-Sheet 1
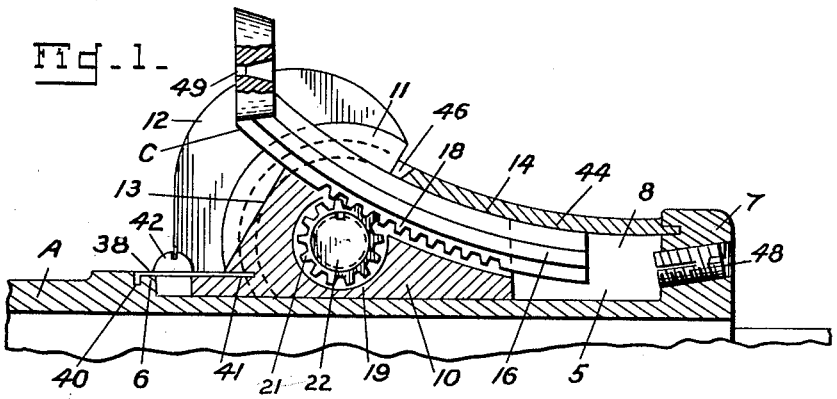
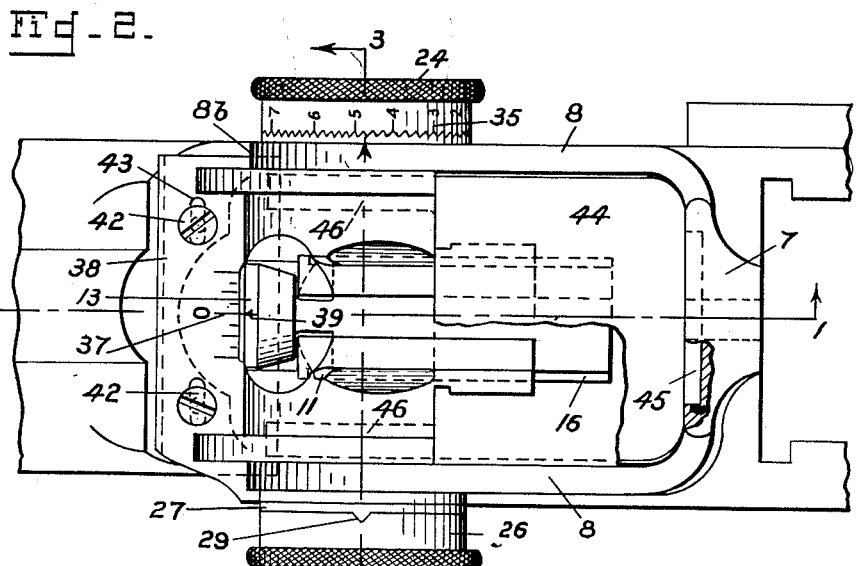
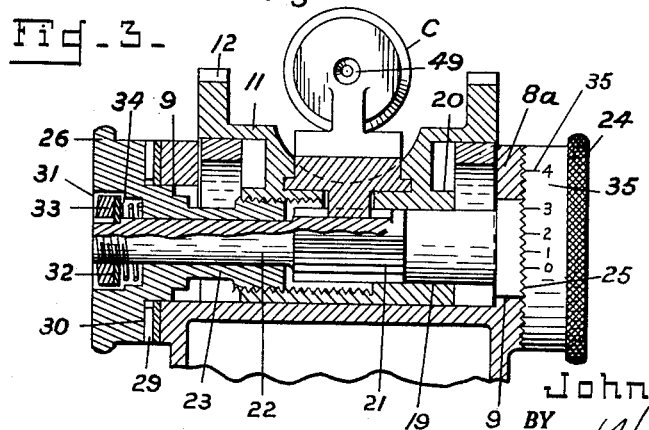
INVENTOR.
John C. Garand
BY W. N. Roach
ATTORNEY Oct. 10, 1933.  J. C. GARAND  1,929,418
GUN SIGHT
Filed Dec. 10, 1930   2 Sheets-Sheet 2
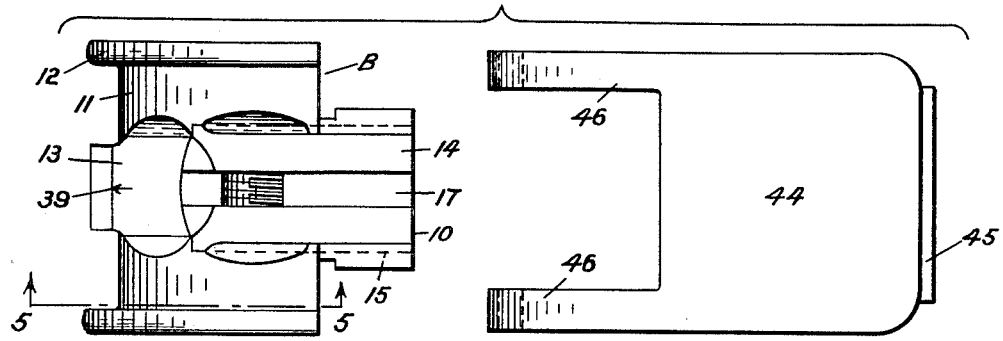
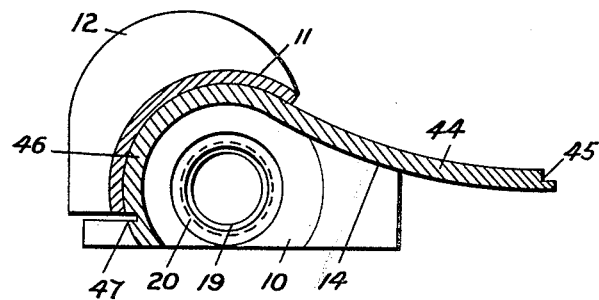
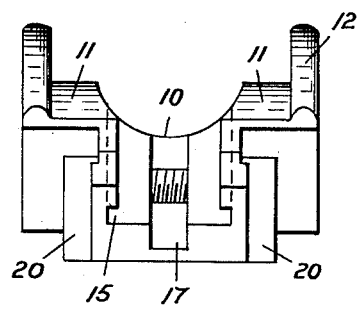
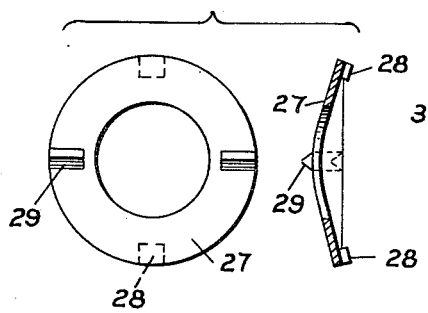
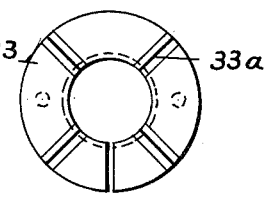
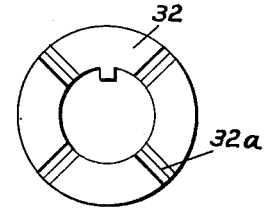
INVENTOR.
John C. Garand
BY W. N. Roach
ATTORNEY Patented Oct. 10, 1933

1,929,418

UNITED STATES PATENT OFFICE 1,929,418

GUN SIGHT

John C. Garand, Springfield, Mass.

Application December 10, 1930
Serial No. 501,326

14 Claims. (Cl. 33—56)

(Granted under the act of March 3, 1883, as
amended April 30, 1928; 370 O. G. 757)

The invention described herein may be manufactured and used by or for the Government for governmental purposes, without the payment to me of any royalty thereon.

The subject of this invention is a sight and more specifically a rear sight for firearms.

The main object of the invention is the provision of a compact, protected, adjustable rear sight.

A further object of the invention is the provision of novel means for adjusting the sight in elevation.

A still further object is the provision of means for adjusting the sight laterally for windage.

With the foregoing and other objects in view, the invention resides in the novel arrangement and combination of parts and in the detail of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a longitudinal sectional view on the line 1—1 of Fig. 2;

Fig. 2 is a plan view partly in section.

Fig. 3 is a sectional view on the line 3—3 of Fig. 2.

Fig. 4 is a plan view of the movable base and cover.

Fig. 5 is a sectional view on the line 5—5 of Fig. 4.

Fig. 6 is a view in front elevation of the movable base.

Fig. 7 is a detail view of the washer on the windage thumbwheel.

Figs. 8 and 9 are detail views of the nut and washer employed in yielding by connecting the coaxial shafts.

Referring to the drawings by characters of reference:

The sight consists essentially of a fixed base A, a movable base B and a sight bar C.

The fixed base A, which may be formed as an integral part of the receiver of a gun, is in the form of a casing or container having the floor 5, a rear end wall 6, a front end wall 7 of greater height than the rear wall and side walls 8—8, having elevated rear portions 8a in which are aligned apertures 9—9. The rear edge 8b of the elevated rear portion of each side plate is formed on a curve struck from the center of the aperture 9.

The movable base B is in the form of a block 10 resting on the floor of the fixed base and of considerably less width than the fixed base so that it is movable transversely therein. The general configuration of the block 10 is best seen in section in Fig. 1. Laterally projecting arcuate webs 11—11 at the rear of the block 10 each serves to carry a vertical ear 12. The spaced ears constitute guard members to protect the sight bar C and when the block 10 is longitudinally centered in the fixed base, the ears are substantially flush with the side walls 8. The arcuate webs 11 have an internal dimension slightly in excess of the curved rear edge 8b of the side walls so that they may overlap the side walls when the movable base B is displaced transversely.

The block 10 is of more or less triangular formation in central longitudinal section, having a plane inclined rear face 13 and a curved inclined forward face 14. The forward face is channeled to provide side walls in which are formed opposite grooves 15—15 for receiving tongues 16—16 on the curved sight bar C. A channel 17 formed in the block 10 centrally between the grooves 15 accommodates the rack 18 on the under side of the sight bar.

The block is formed with a transverse aperture 19 intermediate its length, the sides of the block being enlarged by a boss 20. This aperture opens into the channel 17 so that an elongated pinion 21 on a shaft 22 in the aperture may be in mesh with the rack 18 of the sight bar C.

The shaft 22 which is the elevating shaft, is journaled in the left hand side plate 8 of the fixed base A and in a coaxial shaft 23 which is the windage shaft, journaled in the right hand side plate 8. The inner end of the windage shaft is externally threaded to engage the correspondingly threaded right-hand portion of the aperture 19 so that rotation of the shaft will cause translation of the movable base.

A thumbwheel 24 on the outer end of the elevating shaft 22 has serrated engagement 25 with the side plate 8 while a thumb wheel 26 on the windage shaft 23 may confine a spring washer 27 anchored in the side plate 8 by means of lugs 28 to prevent its rotation and having teeth 29 adapted to engage in recesses 30 spaced angularly on the internal face of the thumbwheel. The shafts 22 and 23 are assembled in axially yielding relation and to this end the shaft 22 extends into a recess 31 in the thumbwheel 26 and terminally receives a keyed lock washer 32 and a nut 33 respectively having spaced radial projections 32a and recesses 33a. A helical spring 34 embracing the shaft 22 is confined between the washer 32 and the floor of the recess 31. By virtue of this arrangement the thumbwheels will be securely held against the sides of the fixed base while being permitted to move axially a sufficient distance to enable the click latches to function.

The elevation thumbwheel 24 is marked peripherally with a range scale 35 registerable against an index 36 on the fixed base and affording a message of the elevation of the sight bar C.

The lateral displacement of the movable base is measured by means of a windage scale 37 inscribed on a plate 38 registerable against an index 39 on the inclined rear face 13 of the block 10. The plate 38 has an angled rear end 40 inserted in a slot in the rear wall 6 of the fixed base and its forward end is inserted in a slot 41 in the block 10. A pair of screws 42—42 passing through slots 43 in the plate 38 and secured in the rear wall 6 adjustably retain the plate in position.

A cover 44 is provided for the forward portion of the fixed base and is arranged to fit between the side walls 8 and between the front wall 7 and the foremost edge of the arcuate webs 11 of the movable base. The cover is supported by means of a key 45 engaging in a groove in the front wall 7 and by a pair of arcuate arms 46 positionable underneath the arcuate webs 11 and resting on the floor 5 of the fixed base. The extremities of the arms are each formed with a slot 47 in which the windage scale plate 38 may engage to hold the cover in place. The arms of the cover do not interfere with lateral movement of the movable base B.

A set screw 48 is threaded in an aperture in the front wall 7 for the purpose of limiting the downward and forward movement of the sight bar C so that pinion 21 may not pass beyond the teeth of the rack and result in injury thereto.

On the upper end of the sight bar C is a sight member 49 herein shown as a peep sight. When the sight bar is in lowered position the sight member 49 will be disposed well within the protection of the ears 12.

By acting on the right thumbwheel the movable base B is translated across the fixed base A to apply lateral corrections corresponding to wind and drift. The left thumbwheel acts, irrespective of the position of translation of the movable base, to move the sight member 49 vertically with respect to the fixed base, an amount which is interpreted in terms of range.

The arrangement of the component elements of the sight provides a strong and compact structure which will withstand severe usage without injury. The positioning of the windage and elevating handwheels on opposite sides of the fixed base enables both of these members to be of a size sufficiently large to facilitate manipulation and provides a simple and effective method of retaining the component parts in assembled relation. Close adjustment of the thumbwheels with respect to the side walls 8 may be maintained so that blows may be received by the thumbwheels without danger of injuring the pinion 21 and the threads on the shaft 23.

I claim:

1. A gun sight comprising a frame having raised side walls, a block within the frame having convergingly inclined upper faces the forward one of which is arcuately channeled and grooved, an arcuate sight bar slidably mounted in the channel and grooves, a screw shaft journaled in the side wall of the frame and threadedly engaging the block, a shaft journaled in the other side wall and in the screw shaft, a pinion on said shaft meshing with the sight bar, means for retaining the screw and pinion shafts in assembled relation, arcuate webs extending laterally from the block and partially encircling the shafts, upstanding ears on the webs, a cover having arcuate arms disposed underneath the webs and a graduated plate secured to the frame and overlying a portion of the block and the extremities of the arcuate arms of the cover.

2. A gun sight comprising a frame having raised side walls, a block within the frame having an inclined face arcuate channeled and grooved, an arcuate sight bar slidably mounted in the channel and grooves, a screw shaft journaled in the side wall of the frame and threadedly engaging the block, a shaft journaled in the other side wall and in the screw shaft, a pinion on said shaft meshing with the sight bar, means for retaining the screws and pinion shafts in assembled relation, arcuate webs extending laterally from the block and partially encircling the shafts and upstanding ears on the webs.

3. A gun sight comprising a frame having raised side walls, a block within the frame having convergingly inclined upper faces the forward one of which is arcuately channeled and grooved, an arcuate sight bar slidably mounted in the channel and grooves, a screw shaft journaled in the side wall of the frame and threadedly engaging the block, a shaft journaled in the other side wall and in the screw shaft, a pinion on said shaft meshing with the sight bar, means for retaining the screw and pinion shafts in assembled relation.

4. A gun sight comprising a frame having raised side walls, a block within the frame, an arcuate sight bar slidable in the upper portion of the block, laterally extending arcuate webs positioned on the rear portion of the block and arranged to clear the side walls of the frame on lateral movement of the block, upstanding ears on the webs, a cover extending across the frame in front of the webs, arcuate arms on the cover disposed underneath the webs adjacent the side walls of the frame, a plate secured to the frame and overlying a portion of the block and the extremities of the arms of the cover, means for moving the block transversely of the frame, and means for moving the sight bar in the block.

5. A gun sight comprising a frame having raised side walls, a block within the frame, an arcuate sight bar slidable in the upper portion of the block, laterally extending arcuate webs positioned on the rear portion of the block and arranged to clear the side walls of the frame on lateral movement of the block, upstanding ears on the webs, a cover extending across the frame in front of the webs, arcuate arms on the cover disposed underneath the webs adjacent the side walls of the frame, means for moving the block transversely of the frame, and means for moving the sight bar in the block.

6. A gun sight comprising a frame having raised side walls, a block within the frame, an arcuate sight bar slidable in the upper portion of the block, laterally extending webs positioned on the rear portion of the block and arranged to clear the side walls of the frame on lateral movement of the block, a cover extending across the frame in front of the webs, arms on the cover disposed underneath the webs adjacent the side walls of the frame, means for moving the block transversely of the frame, and means for moving the sight bar in the block.

7. A gun sight comprising a frame, a block within the frame, means for moving the block transversely of the frame, an arcuate sight bar slidable in the upper portion of the block, spaced ears on the block for protecting the sight bar, and means for moving the sight bar.

8. A gun sight comprising a frame, a block within the frame, means for moving the block transversely of the frame, a sight bar slidable in the block, spaced ears on the block for protecting the sight bar, and means for moving the sight bar.

9. A gun sight comprising a frame, a block within the frame, a screw shaft journaled in the frame and engageable with the block, a sight bar slidable in the block, a pinion shaft journaled in the frame and meshing with the sight bar, members projecting laterally on the block and partially encircling the shafts, and a cover extending across the frame in front of the laterally projecting members of the block.

10. A gun sight comprising a frame, a block within the frame, a screw shaft journaled in the frame and engageable with the block, a sight bar slidable in the block, a pinion shaft journaled on the frame and in the screw shaft and meshing with the sight bar, a nut threaded on one end of the pinion shaft and housed in the screw shaft, a lock washer for the nut keyed on the pinion shaft, and a spring embracing the pinion shaft and confined between the washer and the screw shaft.

11. A gun sight comprising a frame, a block within the frame, a screw shaft journaled in the frame and engageable with the block, a sight bar slidable in the block, a pinion shaft journaled in the frame and in the screw shaft and meshing with the sight bar, and means for resiliently maintaining the screw and pinion shafts in assembled relation.

12. A gun sight comprising a frame, a block within the frame, a screw shaft journaled in the frame and engageable with the block, a sight bar slidable in the block, a pinion shaft journaled in the frame and in the screw shaft and meshing with the sight bar, and means for maintaining the screw and pinion shafts in assembled relation.

13. A gun sight comprising a frame, a block within the frame and having an inclined rear face, a plate secured to the frame and overlying a portion of the rear of the block, the inclined rear face of the block and the plate provided with a cooperating reference mark and scale, and means for moving the block transversely of the frame.

14. A gun sight comprising a frame, a block within the frame and having an inclined rear face, a plate secured to the frame in rear of the block, the inclined rear face of the block and the plate provided with a cooperating reference mark and scale, and means for moving the block transversely of the frame.

JOHN C. GARAND.